(12) United States Patent
Bragin et al.

(10) Patent No.: US 6,834,066 B2
(45) Date of Patent: Dec. 21, 2004

(54) STABILIZATION TECHNIQUE FOR HIGH REPETITION RATE GAS DISCHARGE LASERS

(75) Inventors: Igor Bragin, Göttingen (DE); Vadim Berger, Göttingen (DE); Juergen Kleinschmidt, Weissenfels (DE)

(73) Assignee: Lambda Physik AG, Goettingen (DE)

( * ) Notice: Subject to any disclaimer, the term of this patent is extended or adjusted under 35 U.S.C. 154(b) by 87 days.

(21) Appl. No.: 09/838,715

(22) Filed: Apr. 18, 2001

(65) Prior Publication Data

US 2002/0012371 A1 Jan. 31, 2002

Related U.S. Application Data

(60) Provisional application No. 60/198,058, filed on Apr. 18, 2000.

(51) Int. Cl.[7] .................................................. H01S 3/00
(52) U.S. Cl. ..................... 372/38.1; 372/38.02; 372/61
(58) Field of Search .......................... 372/38.01–38.07, 372/38.1, 38.09, 55–61; 307/419, 420; 361/15, 16

(56) References Cited

U.S. PATENT DOCUMENTS

| | | | |
|---|---|---|---|
| 3,858,056 A | 12/1974 | Melamed et al. | 307/88.3 |
| 3,962,576 A | 6/1976 | Kuhl et al. | 250/201 |
| 4,201,949 A | * 5/1980 | Robbins | 372/38.1 |
| 4,240,044 A | 12/1980 | Fahlen et al. | 331/94.5 PE |
| 4,245,194 A | * 1/1981 | Fahlen et al. | 372/58 |
| 4,380,079 A | 4/1983 | Cohn et al. | 372/87 |
| 4,393,505 A | 7/1983 | Fahlen | 372/57 |
| 4,399,540 A | 8/1983 | Bücher | 372/20 |
| 4,606,034 A | * 8/1986 | Eden et al. | 372/57 |
| 4,611,270 A | 9/1986 | Klauminzer et al. | 364/183 |
| 4,616,908 A | 10/1986 | King | 350/576 |
| 4,686,682 A | 8/1987 | Haruta et al. | 372/87 |

(List continued on next page.)

FOREIGN PATENT DOCUMENTS

| | | | |
|---|---|---|---|
| DE | 38 42 492 A1 | 6/1990 | H01S/3/097 |
| DE | 44 01 892 A1 | 1/1994 | H01S/3/038 |
| DE | 298 22 090 U1 | 3/1999 | H01S/3/08 |
| EP | 0 532 751 A1 | 2/1991 | H01S/3/038 |
| EP | 0 532 751 B1 | 2/1991 | H01S/3/038 |
| EP | 1 075 059 A1 | 2/2001 | H01S/3/0971 |
| EP | 1 085 623 A2 | 3/2001 | H01S/3/0971 |
| EP | 1 107 401 A1 | 6/2001 | H01S/3/038 |
| GB | 2 267 790 A | 12/1993 | H03K/3/57 |
| JP | 61-91982 | 10/1984 | H01S/3/03 |
| JP | 61-116889 | 10/1984 | |
| JP | 3009582 A | 1/1991 | H01S/3/038 |
| WO | WO 96/25778 | 8/1996 | H01S/3/00 |

OTHER PUBLICATIONS

Leonard S. Bobrow, Fundamentals of Electrical Engineering, CBS College Publishing, 1985, p 286, 289.*

F.W. Grover, Inductance Calculations, "Parallel Elements of Equal Length," New York, 1945, pp. 31–44.

Melville, W.S., "The Use of Saturable Reactors as Discharge Devices for Pulse Generators," *The Proceedings of The Institution of Electrical Engineers Part III*, vol. 98, 1951, pp. 185–206.

(List continued on next page.)

*Primary Examiner*—Minsun Oh Harvey
*Assistant Examiner*—Tuan N. Nguyen
(74) *Attorney, Agent, or Firm*—Stallman & Pollock LLP

(57) ABSTRACT

Method and system for providing stabilization techniques for high repetition rate gas discharge lasers with active loads provided in the discharge circuitry design which may include a resistance provided in the discharge circuitry.

30 Claims, 7 Drawing Sheets

U.S. PATENT DOCUMENTS

| | | | |
|---|---|---|---|
| 4,691,322 A | | 9/1987 | Nozue et al. ............... 372/82 |
| 4,718,072 A | | 1/1988 | Marchetti et al. ............ 372/86 |
| 4,719,637 A | | 1/1988 | Cavioli et al. ............... 372/59 |
| 4,763,093 A | | 8/1988 | Cirkel et al. ................. 336/58 |
| 4,797,888 A | * | 1/1989 | Klopotek ................. 372/38.05 |
| 4,829,536 A | | 5/1989 | Kajiyama et al. ............. 372/57 |
| 4,856,018 A | | 8/1989 | Nozue et al. ............... 372/99 |
| 4,860,300 A | | 8/1989 | Bäumler et al. ............. 372/57 |
| 4,891,818 A | | 1/1990 | Levatter .................... 372/57 |
| 4,905,243 A | | 2/1990 | Lokai et al. ................. 372/32 |
| 4,926,428 A | | 5/1990 | Kajiyama et al. ............. 372/20 |
| 4,928,020 A | | 5/1990 | Birx et al. .................. 307/106 |
| 4,953,174 A | | 8/1990 | Eldridge et al. ............. 372/87 |
| 4,975,919 A | | 12/1990 | Amada et al. ................ 372/33 |
| 4,975,921 A | * | 12/1990 | Rothe ..................... 372/38.03 |
| 4,977,563 A | | 12/1990 | Nakatani et al. .............. 372/32 |
| 4,977,573 A | | 12/1990 | Bittenson et al. ............. 372/81 |
| 4,983,859 A | | 1/1991 | Nakajima et al. ............ 307/419 |
| 5,025,445 A | | 6/1991 | Anderson et al. ............. 372/20 |
| 5,090,020 A | | 2/1992 | Bedwell ..................... 372/59 |
| 5,090,021 A | | 2/1992 | Nakatani et al. .............. 372/86 |
| 5,093,832 A | | 3/1992 | Bethune et al. .............. 372/21 |
| 5,095,492 A | | 3/1992 | Sandstrom .................. 372/102 |
| 5,142,166 A | | 8/1992 | Birx ........................ 307/419 |
| 5,142,543 A | | 8/1992 | Wakabayashi et al. ......... 372/32 |
| 5,147,995 A | * | 9/1992 | Chung et al. ............. 219/69.13 |
| 5,150,370 A | | 9/1992 | Furuya et al. ............... 372/106 |
| 5,177,754 A | | 1/1993 | Ball et al. ................... 372/38 |
| 5,181,217 A | * | 1/1993 | Sato et al. ................ 372/38.05 |
| 5,221,823 A | | 6/1993 | Usui ..................... 219/121.78 |
| 5,226,050 A | | 7/1993 | Burghardt ................... 372/20 |
| 5,247,531 A | * | 9/1993 | Muller-Horsche ............ 372/86 |
| 5,247,534 A | | 9/1993 | Müller-Horsche et al. .... 372/58 |
| 5,247,535 A | | 9/1993 | Müller-Horsche et al. .... 372/86 |
| 5,267,253 A | * | 11/1993 | Nakatani ................. 372/38.05 |
| 5,291,510 A | * | 3/1994 | Gidon et al. ................. 372/69 |
| 5,305,338 A | * | 4/1994 | Wakata et al. ............ 372/38.03 |
| 5,305,339 A | * | 4/1994 | Nakatani et al. .......... 372/38.05 |
| 5,309,462 A | * | 5/1994 | Taylor et al. ............. 372/38.03 |
| 5,313,481 A | | 5/1994 | Cook et al. ................. 372/37 |
| 5,315,611 A | | 5/1994 | Ball et al. ................... 372/56 |
| 5,319,665 A | | 6/1994 | Birx ........................ 372/69 |
| 5,337,330 A | | 8/1994 | Larson ...................... 372/86 |
| 5,343,125 A | * | 8/1994 | Bernitz et al. ............... 315/245 |
| 5,365,366 A | | 11/1994 | Kafka et al. ................ 359/330 |
| 5,394,415 A | * | 2/1995 | Zucker et al. ................ 372/26 |
| 5,396,514 A | | 3/1995 | Voss ........................ 372/57 |
| 5,404,366 A | | 4/1995 | Wakabayashi et al. ........ 372/29 |
| 5,427,531 A | | 6/1995 | Kramer ...................... 434/302 |
| 5,448,580 A | | 9/1995 | Birx et al. ................... 372/38 |
| 5,450,207 A | | 9/1995 | Fomenkov et al. ......... 356/416 |
| 5,463,650 A | | 10/1995 | Ito et al. ...................... 372/57 |
| 5,535,233 A | | 7/1996 | Mizoguchi et al. ............ 372/87 |
| 5,557,629 A | | 9/1996 | Mizoguchi et al. ............ 372/87 |
| 5,559,584 A | | 9/1996 | Miyaji et al. ................. 355/73 |
| 5,559,815 A | | 9/1996 | Berger et al. ................ 372/25 |
| 5,559,816 A | | 9/1996 | Basting et al. ............... 372/57 |
| 5,586,134 A | | 12/1996 | Das et al. ................... 372/38 |
| 5,596,596 A | | 1/1997 | Wakabayashi et al. ...... 372/102 |
| 5,638,388 A | | 6/1997 | Nighan, Jr. et al. ........... 372/22 |
| 5,659,419 A | | 8/1997 | Lokai et al. ................ 359/330 |
| 5,663,973 A | | 9/1997 | Stamm et al. ................ 372/20 |
| 5,684,822 A | | 11/1997 | Partlo ........................ 372/95 |
| 5,708,676 A | * | 1/1998 | Minamitani et al. .......... 372/86 |
| 5,710,787 A | | 1/1998 | Amada et al. ................ 372/25 |
| 5,729,562 A | | 3/1998 | Birx et al. ................... 372/38 |
| 5,729,565 A | | 3/1998 | Meller et al. ................ 372/87 |
| 5,748,346 A | | 5/1998 | David et al. ................. 359/15 |
| 5,754,579 A | | 5/1998 | Mizoguchi et al. ............ 372/58 |
| 5,761,236 A | | 6/1998 | Kleinschmidt et al. ..... 372/100 |
| 5,763,855 A | | 6/1998 | Shioji ..................... 219/121.84 |
| 5,771,258 A | | 6/1998 | Morton et al. ................ 372/57 |
| 5,777,867 A | * | 7/1998 | Hongu et al. ............... 363/134 |
| 5,802,094 A | | 9/1998 | Wakabayashi et al. ......... 372/57 |
| 5,811,753 A | | 9/1998 | Weick et al. ........... 219/121.78 |
| 5,818,865 A | | 10/1998 | Watson et al. ................ 372/86 |
| 5,835,520 A | | 11/1998 | Das et al. ................... 372/57 |
| 5,847,861 A | | 12/1998 | Kafka et al. ................ 359/330 |
| 5,852,627 A | | 12/1998 | Ershov ..................... 372/108 |
| 5,854,802 A | | 12/1998 | Jin et al. ..................... 372/22 |
| 5,856,991 A | | 1/1999 | Ershov ....................... 372/57 |
| 5,898,718 A | | 4/1999 | Mohatt et al. ................ 372/22 |
| 5,898,725 A | | 4/1999 | Fomenkov et al. ......... 372/102 |
| 5,901,163 A | | 5/1999 | Ershov ....................... 372/20 |
| 5,914,974 A | * | 6/1999 | Partlo et al. ............. 372/38.08 |
| 5,917,849 A | | 6/1999 | Ershov ..................... 372/102 |
| 5,923,693 A | | 7/1999 | Ohmi et al. .................. 372/57 |
| 5,936,988 A | * | 8/1999 | Partlo et al. ............. 372/38.04 |
| 5,940,421 A | | 8/1999 | Partlo et al. .................. 372/38 |
| 5,946,337 A | | 8/1999 | Govorvok et al. ............ 372/92 |
| 5,949,806 A | | 9/1999 | Ness et al. ................... 372/38 |
| 5,968,080 A | * | 10/1999 | Brewer et al. ................ 607/8 |
| 5,970,082 A | | 10/1999 | Ershov ..................... 372/102 |
| 5,978,391 A | | 11/1999 | Das et al. ................... 372/20 |
| 5,978,394 A | | 11/1999 | Newman et al. .............. 372/32 |
| 5,978,405 A | | 11/1999 | Juhasz et al. ................. 372/57 |
| 5,978,406 A | | 11/1999 | Rokni et al. .................. 372/58 |
| 5,978,409 A | | 11/1999 | Das et al. .................. 372/100 |
| 5,982,795 A | | 11/1999 | Rothweil et al. .............. 372/38 |
| 5,982,800 A | | 11/1999 | Ishihara et al. ............... 372/57 |
| 5,991,324 A | | 11/1999 | Knowles et al. .............. 372/57 |
| 5,999,318 A | | 12/1999 | Morton et al. .............. 359/572 |
| 6,002,697 A | | 12/1999 | Govorkov et al. ............ 372/34 |
| 6,005,880 A | * | 12/1999 | Basting et al. ........... 372/38.04 |
| 6,014,206 A | | 1/2000 | Basting et al. ............... 356/138 |
| 6,014,398 A | | 1/2000 | Hofmann et al. ............. 372/60 |
| 6,016,325 A | | 1/2000 | Ness et al. ................... 372/38 |
| 6,018,537 A | | 1/2000 | Hofmann et al. ............. 372/25 |
| 6,020,723 A | | 2/2000 | Desor et al. ................ 320/166 |
| 6,028,872 A | | 2/2000 | Partlo et al. .................. 372/38 |
| 6,028,880 A | | 2/2000 | Carlesi et al. ................ 372/58 |
| 6,061,382 A | | 5/2000 | Govorkov et al. .......... 372/101 |
| 6,069,454 A | * | 5/2000 | Bouwman et al. ...... 315/209 R |
| 6,081,542 A | | 6/2000 | Scaggs ...................... 372/70 |
| 6,084,897 A | | 7/2000 | Wakabayashi et al. ......... 372/38 |
| 6,097,311 A | | 8/2000 | Morton et al. ................ 372/57 |
| 6,128,323 A | * | 10/2000 | Myers et al. ............... 372/38.1 |
| 6,151,346 A | | 11/2000 | Partlo et al. .................. 372/38 |
| 6,154,470 A | | 11/2000 | Basting et al. ............... 372/19 |
| 6,157,662 A | | 12/2000 | Scaggs et al. ................ 372/60 |
| 6,160,831 A | | 12/2000 | Kleinschmidt et al. ....... 372/57 |
| 6,160,832 A | | 12/2000 | Kleinschmidt et al. ....... 372/57 |
| 6,163,559 A | | 12/2000 | Watson ..................... 372/102 |
| 6,198,761 B1 | | 3/2001 | von Bergmann et al. ..... 372/86 |
| 6,212,211 B1 | | 4/2001 | Azzola et al. ................ 372/33 |
| 6,212,214 B1 | | 4/2001 | Vogler et al. ................ 372/59 |
| 6,219,368 B1 | | 4/2001 | Govorkov ................... 372/59 |
| 6,226,307 B1 | | 5/2001 | Desor et al. ................. 372/37 |
| 6,243,405 B1 | | 6/2001 | Borneis et al. ............... 372/57 |
| 6,243,406 B1 | | 6/2001 | Heist et al. .................. 372/59 |
| 6,269,110 B1 | | 7/2001 | Leinhos et al. .............. 372/57 |
| 6,282,221 B1 | * | 8/2001 | Ohmi et al. .................. 372/57 |
| 6,298,080 B1 | | 10/2001 | Heist et al. .................. 372/99 |
| 6,324,196 B1 | | 11/2001 | Desor ........................ 372/30 |
| 6,389,049 B2 | * | 5/2002 | Yoshida et al. ........... 372/38.02 |
| 6,400,741 B1 | * | 6/2002 | Matsunaga et al. ....... 372/38.02 |
| 6,442,181 B1 | * | 8/2002 | Oliver et al. ................. 372/25 |
| 6,466,599 B1 | * | 10/2002 | Bragin et al. ................ 372/58 |

OTHER PUBLICATIONS

T.Y. Chang, "Improved Uniform–Field Electrode Profiles for TEA Laser and High Voltage Applications," *The Review of Scientific Instruments*, Apr. 1973, vol. 4., No. 4., pp. 405–407.

Birx, et al., "Regulation and Drive System for High Rep–Rate Magnetic Pulse Compressors," *Article prepared for submission to the 15th Power Modulator Symposium, Baltimore, Maryland*, Jun. 14–16, 1982, pp. 1–17.

Smilanski, I., et al., "Electrical Excitation of an XeCl Laser Using Magnetic Pulse Compression," *Appl. Phys. Lett.*, vol. 40, No. 7, Apr. 1, 1982, pp. 547–548.

E.A. Stappaerts, "A Novel Analytical Design Method for Discharge Laser Electrode Profiles," *Appl. Phys. Lett.*, Jun. 15, 1982, vol. 40., No. 12., p. 1018–1019.

Questek, "Magnetic Pulse Compression for Excimer Lasers," *Technical Notes No. 2*, May 1983.

Soldatov, et al., "Copper Vapor Laser with Stabilized Output Parameters," *Sov. J. Quantum Electron.*, vol. 13, No. 5, May 1983, pp. 612–616.

Ernst G.J. et al., "Compact Uniform Field Electrode Profile," *Optics Communications*, vol. 47, No. 1, Aug. 1, 1983, pp. 47–51.

G.J. Ernst, "Uniform–Field Electrodes with Minimum Width," *Optics Communications*, vol. 49, No. 4, Mar. 15, 1984, pp. 275–277.

D. Basting, et al., "Thyratrons with Magnetic Switches: The Key to Reliable Excimer Lasers," *Laser and Optoelektronik*, No. 2, 1984, pp. 128–131.

Endoh, et al., "An Electronically Triggered 200 kV Rail–gap Switch for Wide Aperture Excimer Lasers," *Journal of Applied Physics*, vol. 55, No. 5, Mar. 1, 1984, pp. 1322–1331.

Marchetti, et al., "A New Type of Corona–Discharge Photoionization Source for Gas Lasers," *J. Appl. Phys.* vol. 56, No. 11, Dec. 1984, pp. 3163–3168.

T. Shimada, et al., "An All Solid–state Magnetic Switching Exciter for Pumping Excimer Lasers," *Rev. Sci. Instrum.* vol. 56, No. 11, 1985.

T. Shimada et al., "Semiconductor Switched Magnetic Modulator for Rep–Rate Lasers," *IEEE Pulse Conference*, Crystal City, Virginia, Jun. 10–12, 1985, 4 pages in length.

Kobayashi, O., et al., "High Power Repetitive Excimer Lasers Pumped by an All Solid State Magnetic Exciter," *SPIE*, vol. 622, 1986, pp. 111–117.

Baker, H.J., et al., Magnetic Switching Circuits for Variable High Voltage Pulse Delays and Gas–Laser Synchronisation, *The Institute of Physics*, 1986, pp. 149–152.

Bakert, H.J., et al., "An Efficient Laser Pulser Using Ferrite Magnetic Switches," *IOP Publishing*, 1988, pp. 218–224.

Keet, A.L., et al., "High Voltage Solid State Pulser for High Repetition–Rate Gas Lasers," *EPE Aochen*, 1989, 4 pages.

I. Smilanski, "Reducing Thyratron Losses in CVL Modulator," *Conference Record, 19th Power Modulator Conference*, 1990, San Diego, CA, pp. 287–289.

Greenwood, et al., "An Optimisation Strategy for Efficient Pulse Compression," *IEEE*, Sep. 1990, 9pp. 187–191.

Patent Abstract of Japan: Publication No.: JP 03–105989, Publication date: May 5, 1991, Application No.: 01241739, Sep. 20, 1989, 1 page.

Patent Abstract of Japan: Publication No.: JP 04–109684, Application No.: 02226623, Oct. 4, 1992, 1 page.

von Bergmann, et al., "Thyristor–driven Pulsers for Multikilowatt Average Power Lasers," *IEE Proceedings–B*, vol. 139, No. 2, Mar. 1992, pp. 123–130.

Druckmann, H.M., et al., "A New Algorithm for the Design of Magnetic Pulse Compressors," *IEEE*, Jul. 1992, 99. 213–216.

Handbook of Transformer Design and Applications, by William M. Flanagan, 2nd Edition, 1993: Chapter 10: Design Procedures, pp. 10.1–10.28.

Taylor, R.S., et al., "Pre–Ionization of a Long Optical Pulse Magnetic–Spiker Systainer XeCl Laser," *Rev. Sci. Instrum.* vol. 65, No. 12, Dec. 1994, pp. 3621–3627.

Taylor, R.S., et al., "Transmission Properties of Spark Preionization Radiation in Rare–Gas halide Laser gas Mixes," *IEEE Journal of Quantum Electronics*, vol. 31, No. 12, Dec. 1995, pp. 2195–2207.

T. Efthimiopoulos, et al., "An Auto–pre–pulse and Pre–ionization Long–pulse XeCl Laser," *Journal of Physics E. Scientific Instruments*, Feb. 6, 1995, No. 2, pp. 167–169.

V.M. Borisov et al., "Effects Limiting the Average Power of Compact Pulse–periodic KrF Lasers," *Quantum Electronics*, 1995, vol. 25, No. 5., pp. 421–425.

M. Jung, et al., "PFN's Switched with SCR's at 15 kV, 225J and 100 Hz Rep–Rate," *Proceedings of 22nd International Power Modulator Symposium*, 1996, Boca Raton, FL, U.S.A., pp. 173–176.

Tatsumi Goto, et al., "Design Concept and Performance Consideration for Fast High Power Semiconductor Switching for High Power Excimer Laser," *Rev. Sci. Instrum.*, vol. 68, No. 7, Jul. 1997.

Enami et al., "High Spectral Pourity and High Durability kHz KrF Excimer Laser with Advanced RF Pre–Ionization Discharge," *Proceedings of SPIE*, vol. 3334, Feb. 25–27, 1998, pp. 1031–1040.

Wakabayashi, et al., "Billion Level Durable ArF Excimer Laser with Highly Stable Energy," *SPIE 24th Annual International Symposium on Microlithography, Santa Clara, CA*, May 14–19, 1999.

G.C. Bhar, et al., "Tunable Down–Conversion from an Optical Parametric Oscillator,"*Optics Communications*, vol. 6, No. 4, Dec. 1972, pp. 323–326.

* cited by examiner

STABILIZATION TECHNIQUE FOR HIGH REPETITION RATE GAS DISCHARGE LASERS

RELATED APPLICATION

This application claims priority under 35 USC § 119 to provisional application No. 60/198,058 entitled "Stabilization Technique for the High Repetition Rates Gas Discharge Lasers" filed on Apr. 18, 2000.

BACKGROUND OF THE INVENTION

1. Field of the Invention

The present invention relates to laser systems. In particular, the present invention relates to implementing active loads in the discharge circuitry design of gas discharge lasers to provide stabilization of high repetition rate gas discharge laser systems.

2. Description of the Related Art

Pulse gas discharge lasers, emitting in the deep ultraviolet (DUV) and vacuum ultraviolet (VUV) region are widely used in various industrial applications such as microlithography, photoablation, and micro-machining, among others. For microlithographic applications, currently used systems include line narrowed excimer lasers, such as ArF (193 nm) lasers and KrF (248 nm) lasers, as well as molecular fluorine ($F_2$) lasers emitting at 157 nm, which are efficient and exhibit high energy stability at high repetition rates, for example, at 1–2 KHz or more. FIG. 1 illustrates a schematic arrangement of a pulsed gas discharge electrical circuit of a typical gas discharge laser system. As shown, a pair of discharge electrodes 101, 102 is coupled to a discharge circuit which includes a peaking capacitance Cp and an inherent inductance $L_d$ between the peaking capacitance Cp and the discharge electrode 101. Such discharge electrical circuitry may be found in current gas discharge lasers such as excimer lasers and molecular fluorine laser systems.

Referring to FIG. 1, the area between the discharge electrodes 101, 102 defines a region referred to as a gas discharge region 103. As can be seen, the pair of elongated discharge electrodes 101, 102 of the gas discharge laser, one of which (in this case, the discharge electrode 102) may be connected to a ground or reference potential, are separated by the gas discharge region 103 which is filled with a high pressure laser gas. Moreover, the discharge electrode 101 is connected to the output of the high voltage pulsed generator which is capable of providing fast and powerful charging of the peaking capacitor Cp up to the electrical breakdown voltage of the gas discharge gap. Powerful pulsed source(s) or preionization units for providing ultraviolet light in a spark or corona discharge provide an initial preionization of the gas mixture in the discharge region, and are typically positioned in the vicinity of the gas discharge region 103 between the discharge electrodes 101, 102. The preionizer(s) provide an initial ionization, or preionization, of the laser gas during the charging of the peaking capacitance Cp which receives an electrical pulse initially provided by the charging of a main storage capacitor by a high voltage (HV) power supply when the main storage capacitor is discharged through a switch such as a thyratron or a solid state switch.

Referring back to FIG. 1, in such gas laser systems the HV electrical circuitry which is used for the excitation of the gas discharge in the pulsed gas laser systems may be schematically sub-divided into two parts. The first part of the HV electrical circuitry may include the peaking capacitance Cp which is configured to store electrical energy, and used during the gas breakdown phase. The second part of the HV electrical circuitry may include the HV pulsed power generator which is used for the fast and efficient charging of the peaking capacitor Cp up to the breakdown voltage of the gas. In particular, the HV pulsed power generator may include a suitable HV pulsed device such as a gas filled thyratron, or a solid state switch such as a thyristor or an IGBT).

Additional information may be found in R. S. Taylor, K. E. Leopold, Applied Physics, B59 (1994) 479; U.S. Pat. Nos. 6,020,723, 6,005,880, 5,729,562, 5,914,974, 5,936,988, 6,198,761, 5,940,421, and 5,982,800, and pending U.S. patent applications Ser. Nos. 09/649,595, and 09/453,670, the disclosures of each of which are expressly incorporated herein by reference for all purposes.

A problem encountered with typical pulsed electrical gas discharges in strongly electronegative gas mixtures (i.e., containing a halogen component) at elevated pressures (for example, several bars) is a certain degree of instability. The short phase of the uniform glow discharge, usually less than 100 nanoseconds, corresponding to the pumping of the laser medium, is typically terminated by rapidly developing streamers. The streamers themselves are temporally inconsistent which leads to the discharge instabilities. In addition, the existence of streamers at the ends of discharges produces excessive wear on the electrodes. In view of these problems caused by streamers, it is desired to suppress them. It is therefore desired to have a gas discharge laser including a discharge circuit wherein the main input of the energy into the gas discharge is quickly realized, or that provides very short, intense electrical pulses to the main discharge load, and is terminated without extended and inconsistent streamers reducing the discharge stability from pulse to pulse and without excessively wearing the discharge electrodes.

SUMMARY OF THE INVENTION

In view of the foregoing, a discharge circuit for a pulsed gas laser system in accordance with one embodiment of the present invention includes a pair of spaced-apart electrodes defining a discharge region as a main load, a capacitance coupled to one of the pair of electrodes for providing electrical pulses to the electrodes, and an additional load electrically coupled between the capacitance Cp and one of the discharge electrodes.

The additional load may include one or more resistors, a resistor array, a resistor or resistor array coupled with a variable inductance and/or a saturable inductance, or another dissipative electrical component for dissipating electrically energy between the main load and the capacitance to facilitate termination of electrical discharges between the electrodes and in turn suppress the formation or influence of streamers. The additional load may be coupled in series or in parallel with the capacitance and the main load, and a portion of the additional load may be coupled in series and a portion may be coupled in parallel with the capacitance and the main load. Any series connected portion of the additional load may be coupled to a high voltage or grounded main electrode. The resistor or resistors may have a value comparable to a wave impedance of the discharge circuit. Alternatively, the resistor or resistors may have a value comparable to an active impedance of the gas discharge during a maximum discharge current phase. The additional load is preferably a passive resistance, and may alternatively have an active feature such as a voltage dependence or a temperature dependence.

The circuit may further include a cooling unit, wherein the additional load is provided in the cooling unit. The cooling unit may be provided within a pulsed power module of a laser system which contains electrical components of the discharge circuit particularly susceptible to heating effects. The cooling unit may include one of an air fan and an encapsulated volume with circulating isolating fluid.

One or more preionization units are preferably also provided for ionizing the laser gas within the discharge region between the pair of main electrodes during the charging of the capacitance just prior to discharging through the electrodes.

The capacitance may include a series of peaking capacitors, and may include a series of sustaining capacitors. The sustaining capacitors would be coupled to the electrodes by a different inductance than the peaking capacitors, and would be otherwise preferably coupled within the discharge circuit similarly to the peaking capacitors defining the capacitance coupled to the main electrodes. The pair of electrodes, the capacitance and the additional load may form a series configuration such as an electrical loop, or the additional load may be coupled to the electrodes in parallel with the capacitance. The circuit further includes a power generator configured to provide power to the capacitance for charging the capacitance. The power generator may include a high voltage pulsed power generator. The power generator is preferably connected to a main storage capacitor which is charged during a charging cycle. A solid state switch is used for discharging the main storage capacitor to the rest of the discharge circuit which preferably includes one or more pulse compression stages before the peaking capacitance connected to the main load. A transformer and/or voltage doubling circuit may also be coupled between the main storage capacitor and the pulse compression stages. A processor is connected in a pulse energy or energy dose control feedback loop with a detector for providing charging voltage values to which the power supply charges the main storage capacitor between discharges of electrical pulses.

The circuit may further include a ground terminal coupled to the capacitance.

A discharge circuit in accordance with another embodiment of the present invention includes a pair of discharge electrodes, an area between the pair of electrodes defining a gas discharge area, a peaking capacitance coupled to one of the pair of discharge electrodes, the peaking capacitance configured to store charge, an additional load including a resistor, resistor array for low inductivity, or a resistance coupled with a saturable or variable inductance is coupled between the discharge electrodes and the peaking capacitance, either in series or in parallel, and a ground or reference voltage terminal is further preferably coupled to the other terminal of the peaking capacitance and the main load or discharge electrodes, where the pair of discharge electrodes, the peaking capacitor and the resistor form an electrical loop. That is, a first electrode of the pair of main electrodes is preferably coupled to the peaking capacitance, wherein the additional load is coupled either in series between the peaking capacitance and the first main electrode, and a second main electrode is connected to a ground or reference voltage along with a ground or reference terminal of the peaking capacitance. When the additional load is connected in parallel with the peaking capacitance, the additional load is also preferably connected to the ground or reference voltage.

The circuit may further include a cooling unit for cooling the additional load or resistance.

The gas discharge area may be filled with a high pressure laser gas, e.g., at 2–7 bar, and preferably around 3–5 bar. The gas mixture may include molecular fluorine and an active rare gas such as krypton or argon, of a KrF or ArF laser, respectively, while the gas mixture may be pressurized with a buffer gas of neon and/or helium. The laser active gas may solely include molecular fluorine such as for a molecular fluorine laser, wherein the buffer gas may include neon and/or helium or a combination thereof.

A resistor or a resistor array may be connected between the peaking capacitor and high voltage main electrode, while the other discharge electrode is connected to ground or a reference voltage.

A discharge circuit for use in a laser system in accordance with yet another embodiment of the present invention includes a pair of discharge electrodes, wherein an area between the pair of electrodes defines a gas discharge area. A first peaking capacitance is coupled directly to the pair of electrodes. A second peaking capacitance is also coupled to the pair of electrodes, wherein a resistance or an otherwise additional load is coupled, either in series or in parallel, between the second peaking capacitance and the discharge electrodes. A ground or reference terminal is preferably coupled to the first and second peaking capacitors and a ground electrode of the pair of main discharge electrodes, wherein the pair of discharge electrodes, the second peaking capacitances and the resistance or additional load may form a series electrical loop or parallel electrical combination, while the first peaking capacitance and discharge electrodes form another electrical loop. The additional load may include a resistor, a resistor array, a resistor combined with a variable or saturable or saturable inductance, or other means for dissipating electrical energy between the discharge electrodes and the second peaking capacitance.

The circuit may include a cooling unit for cooling the resistor.

The circuit may include a high voltage pulsed generator to provide power to the first and second peaking capacitors, and the gas discharge area may include a high pressure laser gas.

A method of providing a discharge circuit for a pulsed gas laser system in accordance with still a further embodiment of the present invention includes providing a pair of electrodes, coupling a capacitance to a first electrode of the pair of electrodes, the capacitance configured to store charge, and coupling an additional load between the capacitance and the first electrode.

A further method includes charging a main storage capacitor of a pulsed gas discharge excitation laser system, discharging the main storage capacitor through a pulse compression circuit to a peaking capacitance as an electrical pulse, and dissipating the energy of the electrical pulse through a main load and an additional load, the main load including a discharge region filled with a gas mixture and the additional load including a resistor, resistor array or a resistance coupled with a variable or saturable inductance, and wherein the additional load is coupled either in series between the peaking capacitance and the main load or in parallel with the peaking capacitance.

According to either of the above methods, the load may include a resistor, and the resistor may have a value comparable to a wave impedance of said discharge circuit, or a value comparable to an active impedance of the gas discharge during a maximum discharge current phase.

The method may further include the step of providing cooling the additional load, where the step of cooling may include the step of providing either an air fan or an encapsulated volume with circulating oil.

The method may further include the step of defining a volume between the pair of electrodes as a gas discharge area having a width that allows a clearing ratio of the laser gas to be sufficient in view of the repetition rate of the laser, which may be 2 kHz, 4 kHz or more.

The method may further include the step of providing ionization of a laser gas in the gas discharge area during the charging of the capacitance.

The pair of electrodes, the capacitance and the load may form an electrical loop.

A method of providing a discharge circuit in accordance with yet still another embodiment of the present invention includes defining an area between a pair of discharge electrodes as a gas discharge area, coupling a peaking capacitance to the pair of discharge electrodes, coupling an additional load between one of the discharge electrodes and the peaking capacitance, and coupling a ground or reference voltage terminal to one of the discharge electrodes which couples either directly to a ground terminal of the peaking capacitance or to the peaking capacitance through the additional load, where the pair of discharge electrodes, the peaking capacitance and the additional load form a series or parallel electrical combination.

A method of providing a discharge circuit for use in a laser system in accordance with yet a further embodiment of the present invention includes providing a pair of discharge electrodes, an region between the pair of electrodes defining a gas discharge region, coupling a first peaking capacitance to the pair of electrodes, and coupling a second peaking capacitance to the pair of electrodes, and coupling a resistance or an otherwise additional load between the second peaking capacitance and the discharge electrodes, and coupling one or the discharge electrodes to ground, along with coupling at least one of the first and second capacitances also to ground, wherein if the additional load is coupled between the second peaking capacitance and the ground discharge electrode, then the second capacitance is coupled to ground through the additional load, and if the additional load is coupled to the high voltage discharge electrode, the the second capacitance is coupled directly to ground, and the first capacitance is coupled directly to ground in either case.

These and other features and advantages of the present invention will be understood upon consideration of the following detailed description of the invention and the accompanying drawings.

DETAILED DESCRIPTION OF THE PREFERRED EMBODIMENTS

Figure 1:
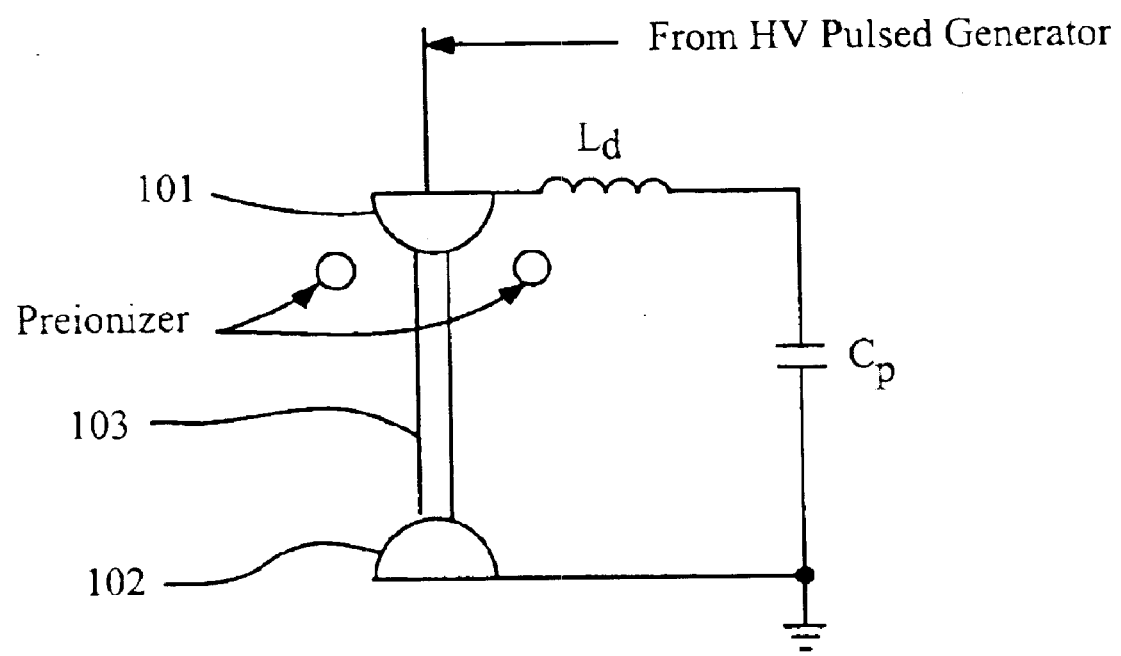
FIG. 1 illustrates a schematic arrangement of a typical discharge circuit of a gas discharge laser.
Figure 2A:
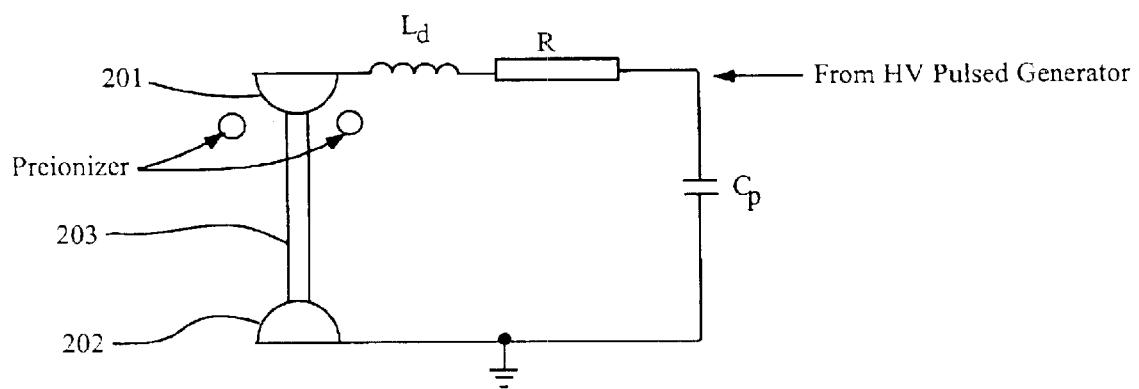
FIG. 2a illustrates a schematic arrangement of a discharge circuit of a gas discharge laser discharge in accordance with a first embodiment of the present invention.
Figure 2B:
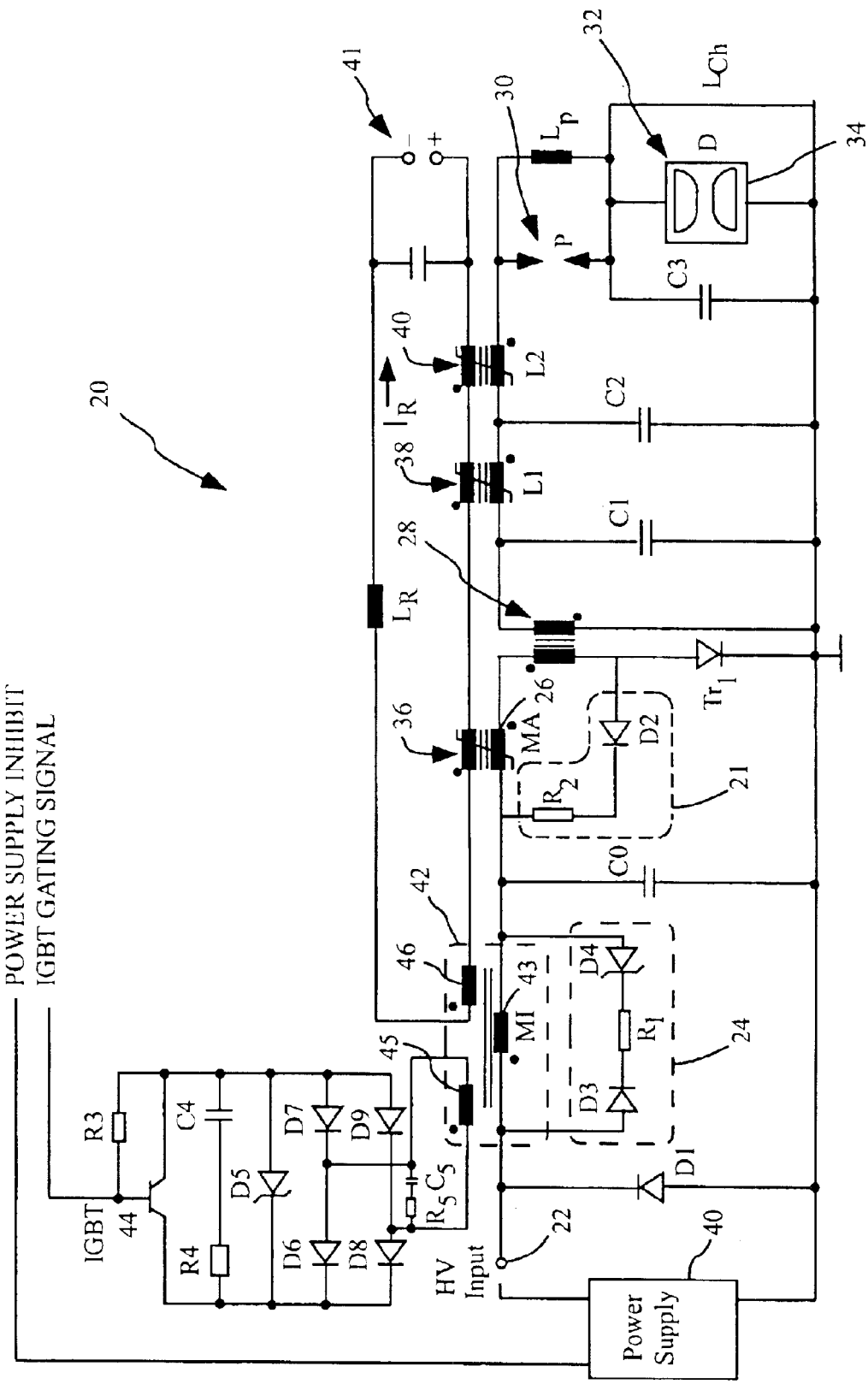
FIG. 2b illustrates a schematic arrangement of an overall discharge circuit of a gas discharge laser in accordance with a preferred embodiment.

FIG. 2a illustrates a schematic arrangement of a laser discharge electrical circuitry in accordance with a first preferred embodiment. Referring to FIG. 2a, there is provided a pair of discharge electrodes 201, 202 coupled to a discharge circuit which includes a peaking capacitor Cp and an inherent inductance Ld therebetween. The discharge electrical circuitry may be used as part of the overall discharge circuitry of a gas discharge laser such as of an excimer or molecular fluorine laser. For this purpose, U.S. Pat. Nos. 6,020,723, 6,160,832, 6,212,214, 6,157,662, 6,154,470 and 6,005,880 and U.S. patent applications Ser. Nos. 09/657,396, 09/247,887, 09/447,882, 09/594,892, 09/418,052, 09/452,353, 09/532,276, 09/453,670, 09/602,184, 09/599,130, 09/598,552, 09/574,921, 09/640,595, 09/629,256, 09/692,265, 09/734,459, 09/715,803, 09/738,849, 09/688,561, 09/718,809, 09/771,013, 09/780,124, 60/204,095, 09/780,120, 09/780,120, 60/200,163, 09/584,420, which are assigned to the same assignee as the present application, are hereby incorporated by reference as describing preferred and alternative embodiments of overall discharge circuits and gas discharge laser systems. U.S. Pat. No. 6,020,723 particularly shows an overall discharge circuit of an excimer or molecular fluorine laser, and more particularly FIG. 2 therein (and which is described in the U.S. Pat. No. 6,020,723 patent wherein that description is not repeated here) which is shown at FIG. 2b herein, according to a preferred embodiment, wherein the circuit shown at FIG. 2b herein is preferably modified according the any the preferred embodiments set forth below and schematically illustrates at FIGS. 2a–6.

Referring back to FIG. 2a, the region between the discharge electrodes 201, 202 is defined as a gas discharge region 203. Moreover, a resistor R is shown provided between the peaking capacitor Cp and the discharge electrode 201. As discussed above, the peaking capacitor Cp is configured to store electrical energy, and is directly used during the phase of the gas breakdown.

The HV pulsed power generator of the HV electrical circuitry is used for the fast and efficient charging of the peaking capacitor Cp until the breakdown voltage of the gas. In particular, the HV pulsed power generator may include any suitable HV pulsed device such as including a gas filled thyratron, or a solid state switch (for example, a thyristor or an IGBT-based switch), for discharging a main storage capacitor through one or more pulse compression stages to the peaking capacitance. A transformer is also preferably included between the main storage capacitor and the pulse compression circuit. The main storage capacitor is charged by a high voltage power supply which receives signals indicative of charging voltages to be applied to the discharge electrodes from a processor which monitors pulses energies and/or moving average pulse energies or energy doses in a feedback loop with the power supply circuit.

As can be seen from FIG. 2a, the resistor R is connected in series between the discharge electrode 201 and the peaking capacitor Cp. In this manner, in accordance with one embodiment of the present invention, the resistor R functions as an additional load in the electrical circuit of the gas discharge electrical loop.

In the manner described above, in accordance with one aspect of the present invention, an additional load such as resistors or a resistor array may be implemented into the electrical circuitry of the gas discharge. In addition, the additional load may include a variable or saturable inductor or other dissipative electrical component known to those skilled in the art. More particularly, in accordance with one aspect of the present invention, the resistor may be coupled directly in series with the gas discharge. As described below, the additional load may be coupled in parallel to the peaking capacitance, and may be partly coupled in series and partly coupled in parallel with the peaking capacitance. The value of the resistor may be comparable to the active impedance of the gas discharge during the main phase of the dissipation of the energy in the gas discharge. Furthermore, the resistance value may be comparable to the wave impedance of the gas discharge electrical loop, and in particular, may be less or greater than the wave impedance.

Figure 3:
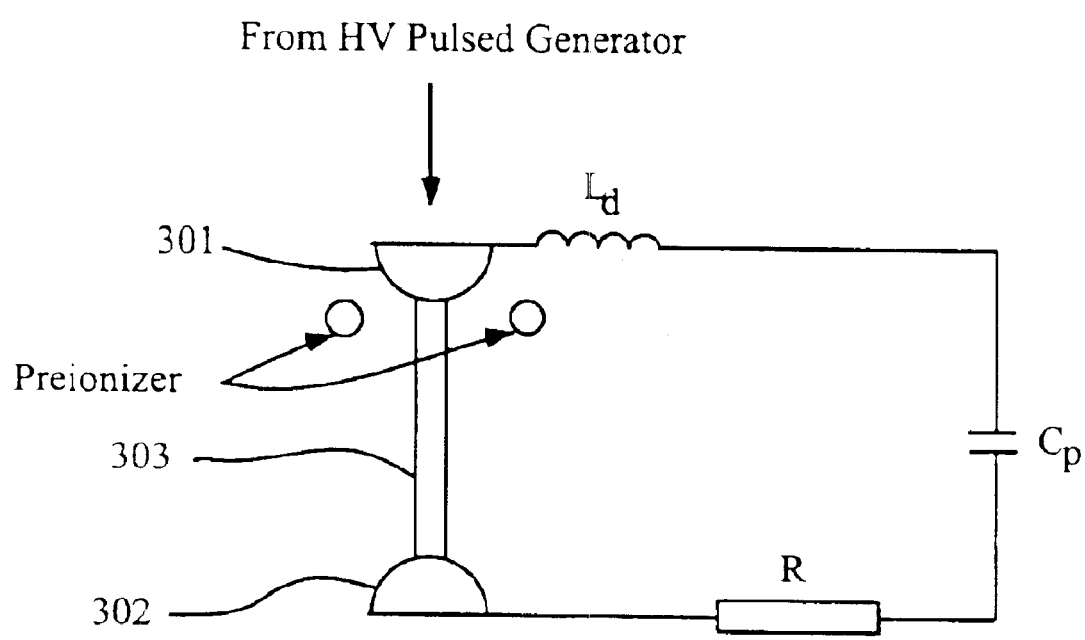
FIG. 3 illustrates a schematic arrangement of a discharge circuit of a gas discharge laser in accordance with a second embodiment of the present invention.

FIG. 3 illustrates a schematic arrangement of a laser discharge electrical circuitry in accordance with a second preferred embodiment. Referring to FIG. 3, there is provided a pair of discharge electrodes 301, 302, the region between which defining a gas discharge region 303. Further shown in FIG. 3 is inductance Ld which may be inherent in the circuitry, and a peaking capacitor Cp coupled to the discharge electrode 301. Moreover, a resistor R is coupled between the discharge electrode 302 and the peaking capacitor Cp. In contrast to the first preferred embodiment described above, the resistor R is coupled between the peaking capacitance and a ground or reference discharge electrode 302, rather than to the high voltage electrode 301.

As can be further seen from FIG. 3, power from the HV pulsed power generator is applied to the discharge electrode 301, which, as discussed above, is used for charging the peaking capacitor Cp until the breakdown voltage of the gas. In contrast, as discussed above, the power from the HV pulsed power generator in the embodiment shown in FIG. 2 is applied at a node between the resistor R and the peaking capacitor Cp.

Indeed, as can be seen from FIGS. 2 and 3, in accordance with the embodiments of the present invention, a resistor R is placed in series between the peaking capacitors Cp and at least one of the main discharge electrodes (electrode 201 in FIG. 2, and electrode 302 in FIG. 3) of the gas discharge laser (such as, for example, an excimer laser or a molecular fluorine laser) to add additional loads between the peaking capacitor Cp and the at least one of the discharge electrodes. In one embodiment, the resistor R may be replaced by other circuit elements, e.g., $CuSO_4$ solutions which adds additional active loads between the peaking capacitor Cp and the at least one of the discharge electrodes.

Moreover, while the heat dissipation in the resistor(s) R may be significant, some precaution for cooling the resistor(s) R may be used. In particular, the cooling element may include an air fan or an encapsulated volume (box) with circulating oil or other insulating fluid (provided for insulation). More specifically, in the latter case of the insulating fluid, the fluid could be cooled by means of a heat exchanger with cold line water. Additionally, the encapsulated box in one aspect may be fabricated with dielectric or metal with feedthroughs for the connection of the resistor(s) R to the element of the gas discharge loop.

In addition, it should be noted that the placement of the resistor(s) R in the laser discharge circuit may require some efforts in cooling. To this end, additional equipment for cooling the resistor(s) R may be incorporated into the laser arrangement. Furthermore, the resistor(s) R in one aspect may be implemented into the laser pulsed power module which itself requires a cooling unit. In this approach, additional cooling unit may be unnecessary. Moreover, in the case where the resistor(s) R are integrated into the laser pulsed power module, the laser pulsed power module may have distributed multiple outputs rather than a single output, connected directly to the laser discharge electrodes or to the peaking capacitor Cp arrangement around the laser discharge electrodes (laser discharge chamber).

Figure 4:
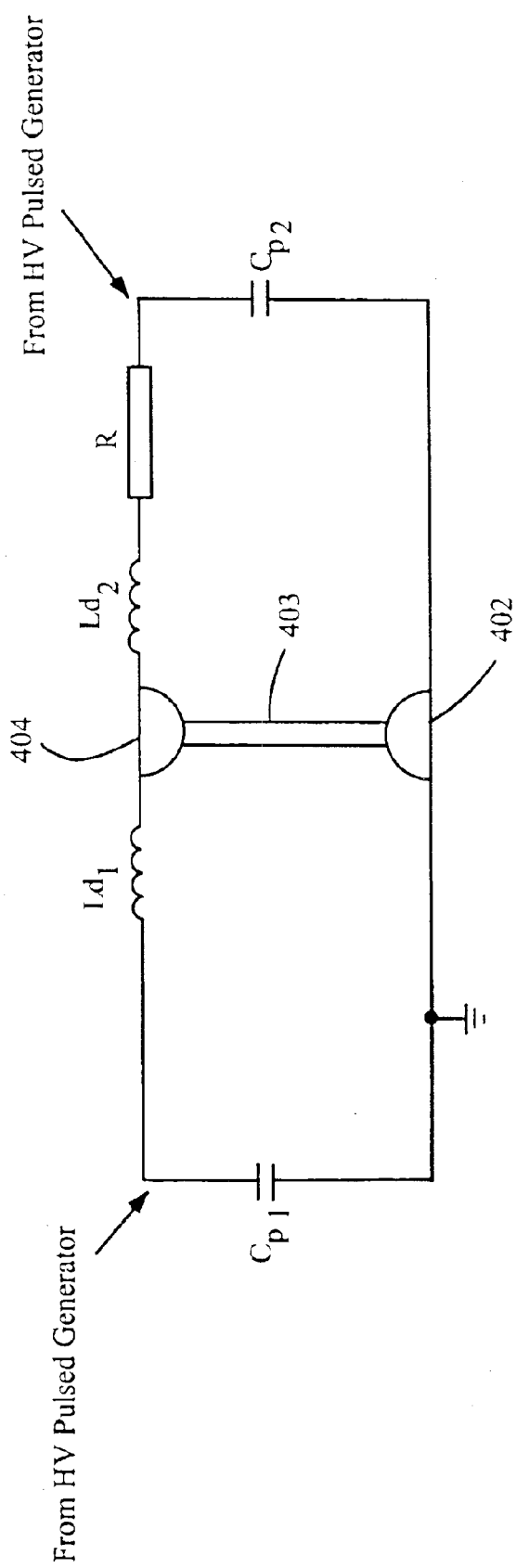
FIG. 4 illustrates a schematic arrangement of a discharge circuit of a gas discharge laser in accordance with a third embodiment of the present invention.

FIG. 4 illustrates a schematic arrangement of a laser discharge electrical circuitry in accordance with yet another embodiment of the present invention. Referring to FIG. 4, there is provided a pair of discharge electrodes 401, 402, with the area between the two electrodes 401, 402 defining a gas discharge area 403. Further shown in FIG. 4 are inductances Ld1 and Ld2, which may be inherent to the circuitry shown and differ in value preferably due to there being different lengths of connecting conductors between the first and second peaking capacitors and the electrodes 401, first and second peaking capacitors Cp1 and Cp2 respectively coupled to the discharge electrode 402. Additionally, a resistor R is provided between the discharge electrode 401 and the second peaking capacitor Cp2, wherein the resistor or otherwise additional load may be connected between either peaking capacitance Cp1 or Cp2 and the electrode 402, or some or all of the additional load may be connected in parallel with the capacitance Cp1 and/or Cp2. Finally, the power from the HV pulsed power generator is applied as shown at a node between the first peaking capacitor Cp1 and the discharge electrode 401, and at a node between the second peaking capacitor Cp2 and the resistor R.

As can be seen, the discharge circuit shown in FIG. 4 may be configured to act similar to a spiker-sustainer discharge circuit, or may be otherwise configured as set forth at U.S. patent application Ser. No. 09/640,595, which is assigned to the same assignee as the present application and is hereby incorporated by reference. In particular, the first peaking capacitor Cp1 is positioned as close as possible to the electrode 401 and thus the gas discharge chamber to provide fast electrical pumping to near the steady state discharge level. The second peaking capacitor Cp2 is connected to the electrodes 401, 402 via the resistor R. The resistor R stabilizes the current through the discharge during the steady state discharge. If the peaking capacitors Cp1, Cp2 are positioned on the opposite sides of the discharge electrodes as shown in FIG. 4, the discharge itself divides the entire peaking capacity in a "spiker-part" (i.e., Cp1 and a "sustainer-part" (Cp2)). In this case, there may be no need for additional saturable inductivities. Furthermore, it should be noted that the approach shown in FIG. 4 is not limited to the discharge circuit shown in FIG. 4, but may be applied to similar circuits for pulsed discharges, and further, also for values of the resistors less than or equal to 0.01 Ohms.

In the manner described above, in accordance with one aspect of the present invention, additional load such as resistors may be implemented into the electrical circuitry of the gas discharge. More particularly, in accordance with one aspect of the present invention, the resistor may be coupled in series with the gas discharge. The value of the resistor may be comparable to the active impedance of the gas discharge during the main phase of the dissipation of the energy in the gas discharge. Furthermore, the resistance value may be comparable to the wave impedance of the gas discharge electrical loop, and in particular, in principle, may be less or greater than the wave impedance.

As an example, resistors of type KOAOHM HPC5-K 22 Ohm which is 44 mm in length and 8 mm in diameter, is connected in parallel from 10 to 40 pieces. The resulting data is shown below in Table 1 which was measured with KrF laser.

TABLE 1

| Resistance-Ohm | 1.83333 | 1.1 | 0.6875 |
|---|---|---|---|
| Estor, J (stored energy) | 2.888 | 2.888 | 2.888 |
| Eres, J (dissipated energy) | 0.91281 | 0.78639 | 0.85369 |
| Eres, % from Estor (dissipated energy) | 31.6069 | 27.2295 | 29.5599 |
| (Estor-Eres), J | 1.97519 | 2.10161 | 2.03431 |
| (Estor-Eres), % from Estor | 68.3931 | 72.7705 | 70.4401 |
| Eout, mJ | 30.6 | 35 | 38.1 |
| (laser output energy) | | | |
| Eff, tot, % | 1.05956 | 1.21191 | 1.31925 |
| Eff, -res, % | 1.54922 | 1.66539 | 1.87287 |
| Eout0, mJ without resistors | 45 | 45 | 45 |
| Eout, % from Eout0 | 68 | 77.7778 | 84.6667 |
| Eff, % without resistors | 1.55817 | 1.55817 | 1.55817 | where total percentage of efficiency (Eff, tot, %) indicates the efficiency of the laser emission (broadband), determined by taking into account the whole energy (Estor) stored in the storage capacitor of the HV pulsed generator, and further, where the total percentage of efficiency with the resistor elements (Eff, -res, %) indicates the efficiency of the laser emission (broadband). Advantageous features particularly resulting from the values shown at Table 1 can be summarized: For a resistor with R=0.69_

The dissipated energy in the discharge region is reduced by 29.6%

The efficiency (output energy/energy stored in the discharge volume) has be increased by 19.8% in comparison to the case of no additional load.

Implementing additional resistors in the gas discharge electrical loop may reduce the laser output energy. However, the decrease in the laser output energy is not proportional to the decrease of the energy dissipated in the gas discharge which takes place due to the simultaneous dissipation of the energy in the resistors. More specifically, the laser efficiency determined from the power dissipated in the gas discharge may be increased, which, in turn, indicates that part of the losses in this case could be shifted to the resistors placed outside of the laser tube. This is significant for laser operation at the high repetition rates, while allowing a reduction of the thermal load of the laser tube (i.e., the laser electrodes and laser gas). Moreover, the issue of cooling the laser gas inside the laser tube could be in part, replaced by the cooling of the resistor(s) placed outside of the laser tube. This may also have a positive impact upon the blowing of the laser gas between the discharge electrodes. In other words, while the stress of the discharge electrodes and gas may be less, the necessary gas velocity could be reduced.

Even in the case where the value of the resistance is relatively small (resulting in low dissipated power in the resistors), their role in the gas discharge circuitry is significant, since the resistor is configured to terminate the gas discharge at the latest stages of microarcing and streamers when the gas discharge active impedance is low and the wearing of the laser electrodes and gas is maximized.

Furthermore, in one aspect, the resistors of the gas discharge circuitry may make the gas discharge more soft and uniform, thus improving the laser output pulse-to-pulse energy stability. Moreover, with the various aspects of the present invention, the performance of the laser system at a high repetition rates may be improved, thus improving the lifetime of the laser tube and laser gas.

As discussed above, the peaking capacitors may be equivalent and be positioned as close as possible to the gas discharge chamber to provide fast and powerful electrical pumping of the laser active volume which is designed for the excimer or molecular fluorine laser systems. Furthermore, the peaking capacitors may be further subdivided into several groups of capacitors with different connection inductivities to the gas discharge electrodes, and may have different HV power generators, or operate as the transforming lines. In this regard, it should be noted that the HV electrical circuitry may include additional elements and sub-circuits connected between the main gas discharge electrodes for correction of the waveform of the high voltage pulse applied between the electrodes.

In this manner, one aspect of the present invention is directed to implementing additional loads (e.g. resistors or resistor arrays or resistors or resistor array coupled with one or more variable or saturable inductors) in the peaking circuit and in particular coupled in series with the discharge. The value of the resistor may be comparable to the active impedance of the gas discharge during the main phase of the dissipation of the energy in the gas discharge. Furthermore, the resistance value may be comparable to the wave impedance of the gas discharge electrical loop, and in particular, in principle, may be less or greater than the wave impedance.

Figure 5:
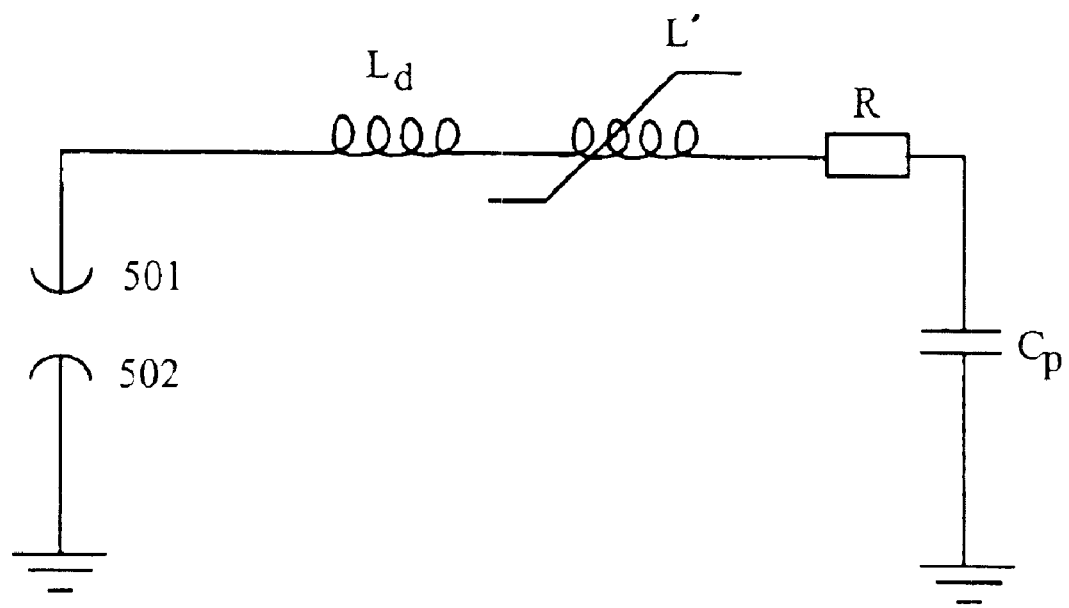
FIG. 5 illustrates a schematic arrangement of a discharge circuit of a gas discharge laser in accordance with a fourth embodiment of the present invention.

FIG. 5 schematically illustrates a fourth preferred embodiment. The fourth embodiment is similar to that described above and shwon at FIG. 2. The difference between the fourth and first embodiments is that a variable or saturable inductance L' is inserted between the peaking capacitance and the discharge electrode 501. A variable or saturable inductance L' may be similarly inserted into the circuits shown and described with respect to either of the second or third embodiments of FIG. 3 or 4, as well.

Figure 6:
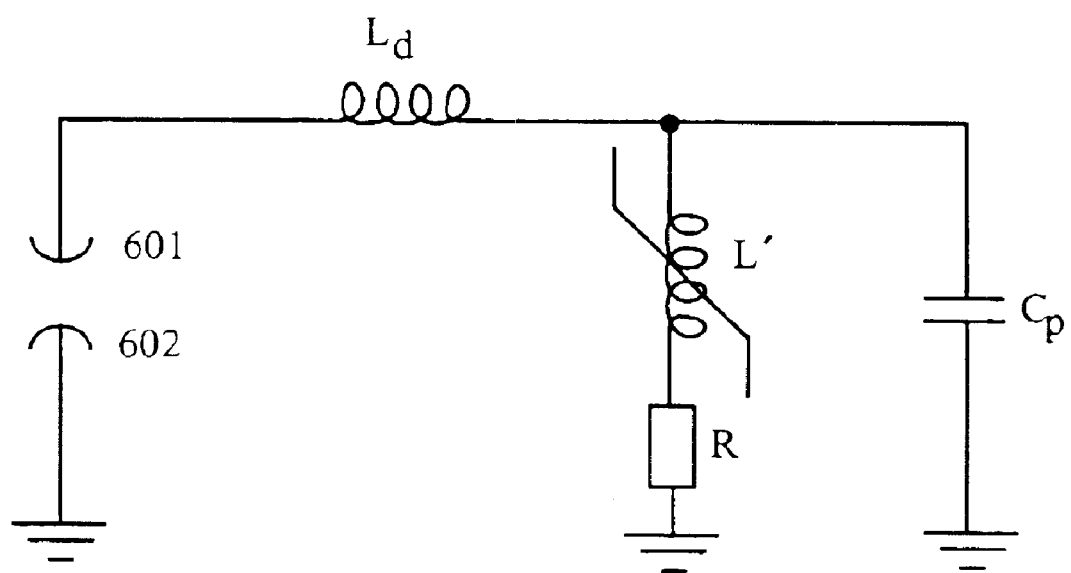
FIG. 6 illustrates a schematic arrangement of a discharge circuit of a gas discharge laser in accordance with a fifth embodiment of the present invention.

FIG. 6 schematically illustrates a fifth preferred embodiment. The general feature of the fifth embodiment of FIG. 6 is that the additional load is inserted in parallel with the peaking capacitance Cp and the electrodes 601, 602. The circuit of the fifth embodiment may or may not include the variable or saturable inductance L' in series with the resistance R, i.e., inclusion of the variable or saturable inductance is optional. In addition, any of the preferred embodiments described above and shown at FIGS. 1–5 may be modified such that all or a part of the additional load is coupled in parallel with the peaking capacitance Cp, Cp1 and/or Cp2. Alternatively, the variable or saturable inductance L' may be coupled in series with the peaking capacitance and either electrode 601, 602 while the resistance R is coupled in parallel, as shown in FIG. 6, and the resistance R may be coupled in series with either of the electrodes 601, 602 while the variable or saturable inductance L' is coupled in parallel, as shown in FIG. 6.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A discharge circuit for a pulsed gas laser system, comprising:
   a pair of electrodes wherein an area between said pair of electrodes defines a gas discharge area;
   a capacitor and a load in series and coupled to a first electrode of said pair of electrodes such that the load is disposed between the capacitor and the firs electrode;
   a high voltage pulsed generator coupled to said capacitor, wherein the capacitor operates to receive a charge from the high voltage pulsed generator and to store the charge, and to then apply the charge to the first electrode where it is discharged through the electrodes, and the load operates to dissipate energy transmitted through it as a result of a discharge in the gas discharge area; and a cooling unit and said load is provided in said cooling unit.

2. The circuit of claim 1 wherein said load includes a resistor.

3. The circuit of claim 2 wherein said resistor has a value comparable to a wave impedance of a gas discharge electrical loop.

4. The circuit of claim 2 wherein said resistor has a value comparable to an active impedance of the gas discharge during a maximum discharge current phrase.

5. The circuit of claim 1 wherein said cooling unit is provided in a pulsed power module of the laser system, and wherein the pulsed power module contains the high voltage pulsed generator.

6. The circuit of claim 1 wherein said cooling unit includes one of an air fan and an encapsulated volume with circulating oil.

7. The circuit of claim 1 wherein said gas discharge area is configured to provide ionization of a laser gas during the charging of said capacitance.

8. The circuit of claim 1 wherein said capacitor includes a peaking capacitor.

9. The circuit of claim 1 wherein said pair of electrodes, said capacitor and said load form an electrical loop.

10. The circuit of claim 1 wherein said load includes an active load.

11. The circuit of claim 1 further including a ground terminal coupled to said capacitor.

12. A discharge circuit, comprising:

a pair of discharge electrodes, a region between said pair of electrodes defining a gas discharge region;

a peaking capacitor and a resistor in series, wherein the peaking capacitor and the resistor are coupled to a first discharge electrode of the pair of electrodes, and the resistor is disposed between the first electrode and the capacitor;

a high voltage pulse generator coupled to the peaking capacitor, wherein the peaking capacitor operates to store a charge received from the high voltage pulse generator which is then discharged through the discharge electrodes, and said resistor configured to dissipate energy transmitted through it as a result of a discharge in the gas discharge region; and a ground terminal coupled to said peaking capacitor and a second electrode of said pair of discharge electrodes;

wherein said pair of discharge electrodes, said peaking capacitor and said resistor form an electrical loop; and a cooling unit for cooling said resistor.

13. The circuit of claim 12 wherein said gas discharge area includes high pressure laser gas.

14. A discharge circuit for use in a laser system, comprising:

a pair of discharge electrodes, an area between said pair of electrodes defining a gas discharge area;

a first peaking capacitor coupled between a first electrode of the pair of discharge electrodes and a ground terminal said first peaking capacitor configured to store a charge;

a second peaking capacitor, different from said first peaking capacitor, and a resistor in series, and the second peaking capacitor and the resistor coupled between the first electrode and the ground terminal, and wherein the resistor is disposed between the first electrode and said second capacitor configured to store a charge which is discharged through the discharge electrodes, said resistor configured to dissipate energy transmitted through it as a result of a discharge in the gas discharge area; and a high voltage pulse generator which is coupled to the second peaking capacitor to apply a voltage to the second peaking capacitor; and a cooling unit for cooling said resistor.

15. The circuit of claim 14 wherein said gas discharge area includes high pressure laser gas.

16. An excimer or molecular fluorine laser, comprising:

a discharge chamber filled with a gas mixture including a halogen component, the discharge chamber also including a pair of main discharge electrodes;

a pulsed discharge circuit coupled to the pair of main discharge electrodes;

wherein the pulsed discharge circuit includes:

a main storage capacitor coupled to a pulse compression circuit;

a peaking capacitor and a resistive component in series, and wherein the peaking capacitor and the resistive component are coupled to a first discharge electrode of the pair of main discharge electrodes, such that resistive component is disposed between the peaking capacitor and the first discharge electrode;

wherein an output of the pulse compression circuit is coupled to the peaking capacitor such that a charge is transferred from the pulse compression circuit and then stored in the peaking capacitor and then discharged in the main discharge electrodes;

wherein the resistive component dissipates energy transmitted through it as a result of a discharge between the main discharge electrodes;

a cooling unit for cooling the resistive component; and wherein the peaking capacitor includes a plurality of capacitors connected to each other in parallel.

17. The laser of claim 16, further comprising a second peaking capacitor coupled to the pulse compression circuit and the first discharge electrode.

18. The laser of claim 17, wherein a first electrical connection between the peaking capacitor and the first discharge electrode has a different inherent inductance than a second electrical connection between the second peaking capacitor and the first discharge electrode.

19. The laser of claim 16, wherein the resistive component includes a resistor.

20. The laser of claim 16, wherein the resistive component includes a resistor and a variable inductor.

21. A method for providing an electrical pulse to discharge electrodes of an excimer or molecular fluorine laser, comprising the steps of:

charging a main storage capacitor of a pulsed gas discharge excitation laser system;

discharging an electrical charge from the main storage capacitor through a pulse compression circuit to a peaking capacitance coupled with the discharge electrodes as an electrical pulse; and storing the electrical charge in the peaking capacitance, and then transmitting the electrical charge from the peaking capacitance to the discharge electrodes whereby the electrical charge is discharged between the discharge electrodes;

providing a load coupled between a first electrode of the discharge electrodes, and the peaking capacitance;

dissipating an energy of an electrical pulse resulting from the transmitting of the electrical charge to the discharge electrodes in the load coupled between the peaking capacitance and the first electrode of the discharge electrodes, and cooling the load; and wherein the dissipation through the additional load stabilizes the current through the discharge electrodes.

22. The method of claim 21 wherein the discharging step includes discharging the main capacitor to the peaking capacitance and a second peaking capacitance, wherein, of the peaking capacitance and the second peaking capacitance, the load is coupled only between the peaking capacitance and the first electrode of the discharge electrodes.

23. A pulsed gas laser system, comprising:

a laser tube including a first electrode and a second electrode and laser gas; and a capacitor and a load in series, and wherein the capacitor and load are coupled between the first electrode and ground, wherein the load is disposed between the capacitor and the first electrode;

a pulse compression circuit which is coupled to the capacitor, and operates to apply a voltage to the capacitor, and wherein the capacitor operates to store electrical energy and apply the stored electrical energy to the first electrode; and wherein the load operates to dissipate streamers generated by a glow discharge of the laser tube which results when stored electrical energy from the capacitor is applied to the first electrode;

a cooling apparatus which cools the load; and wherein the capacitance and the load are located out of the laser tube.

24. The system of claim 23 wherein the load includes a resistor.

25. The system of claim 24 wherein the resist has a value comparable to a wave impedance of a gas discharge loop.

26. The system of claim 24 wherein the resistor has a value comparable to an active impedance of a gas discharge during a maximum discharge current phase.

27. The system of claim 23 wherein the load is positioned in a pulsed power module, wherein the pulsed power module contains the pulse compression circuit.

28. The system of claim 23 wherein the cooling apparatus includes a first fan which is disposed outside of the laser chamber, and positioned to cool the load.

29. The system of claim 28 further including a second fan disposed in the laser chamber for circulating laser gas in the laser chamber.

30. The system of claim 23 wherein the load is encapsulated volume with circulating oil.

* * * * *